(12) United States Patent
Yokose et al.

(10) Patent No.: US 7,751,616 B2
(45) Date of Patent: Jul. 6, 2010

(54) CODING APPARATUS AND METHOD AND STORAGE MEDIUM STORING PROGRAM

(75) Inventors: Taro Yokose, Nakai-machi (JP); Masanori Sekino, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1011 days.

(21) Appl. No.: 11/236,789

(22) Filed: Sep. 28, 2005

(65) Prior Publication Data
US 2006/0215921 A1 Sep. 28, 2006

(30) Foreign Application Priority Data
Mar. 23, 2005 (JP) ............................... 2005-083506

(51) Int. Cl.
*G06K 9/00* (2006.01)
*G06K 9/36* (2006.01)

(52) U.S. Cl. ....................... 382/166; 382/238
(58) Field of Classification Search ........................ None
See application file for complete search history.

(56) References Cited

U.S. PATENT DOCUMENTS

| | | | | |
|---|---|---|---|---|
| 5,367,629 A | * | 11/1994 | Chu et al. | 382/253 |
| 5,544,286 A | * | 8/1996 | Laney | 358/1.15 |
| 5,990,864 A | * | 11/1999 | DeAguiar et al. | 345/600 |
| 6,983,074 B1 | * | 1/2006 | Clauson et al. | 382/244 |
| 7,035,459 B2 | * | 4/2006 | Ishiga | 382/166 |
| 7,130,462 B2 | * | 10/2006 | Nakami | 382/166 |
| 7,181,072 B2 | * | 2/2007 | Wang et al. | 382/239 |
| 7,212,680 B2 | * | 5/2007 | Shin | 382/246 |
| 7,409,083 B2 | * | 8/2008 | Yano | 382/166 |
| 2002/0186890 A1 | * | 12/2002 | Lee et al. | 382/239 |
| 2005/0063587 A1 | * | 3/2005 | Nishiwaki et al. | 382/166 |

OTHER PUBLICATIONS

Gregory Baxes, "Lossless Predictive Coding", in Digital Image Processing, John Wiley & Sons, Inc., 1994.*

* cited by examiner

*Primary Examiner*—Yuzhen Ge
(74) *Attorney, Agent, or Firm*—Oliff & Berridge, PLC (57) ABSTRACT

A coding apparatus includes a color space conversion unit that converts input image data into image data which is represented in another color space, a gradation changing unit that changes gradation of the input image data, based on the converted image data, and a predictive coding unit that performs predictive coding on the image data subjected to the gradation change.

10 Claims, 11 Drawing Sheets

CODING PROGRAM 52

FIG. 1

IMAGE PROCESSING APPARATUS 2

FIG. 4A

| COLOR COMPONENT | TOLERANCE |
|---|---|
| Y | ± * |
| Cb | ± * |
| Cr | ± * |

} TOLERANCE CAN BE SET INDEPENDENTLY FOR EACH COLOR COMPONENT

THRESHOLDS OF COLOR COMPONENTS

FIG. 4B

| COLOR COMPONENT | PIXEL OF INTEREST | PREDICTED VALUE | PREDICTION ERROR |
|---|---|---|---|
| Y | * * | * * | Δ * |
| Cb | * * | * * | Δ * |
| Cr | * * | * * | Δ * |

EXAMPLE OF PREDICTION ERROR EVALUATION WITH REGARD TO REFERENCE PIXEL A

⋮

| COLOR COMPONENT | PIXEL OF INTEREST | PREDICTED VALUE | PREDICTION ERROR |
|---|---|---|---|
| Y | * * | * * | Δ * |
| Cb | * * | * * | Δ * |
| Cr | * * | * * | Δ * |

EXAMPLE OF PREDICTION ERROR EVALUATION WITH REGARD TO REFERENCE PIXEL D

PREDICTED VALUES OF REFERENCE PIXEL IN WHICH PREDICTION ERRORS FOR ALL COLOR COMPONENTS ARE LESS THAN THEIR THRESHOLDS ARE APPLIED

REFERENCE PIXELS REFERRED TO BY PREDICTED VALUE PROVISION PART AND PREDICTION PARTS

FIG. 6B

| PREDICTION PART | CODE |
|---|---|
| A | CODE A |
| B | CODE B |
| C | CODE C |
| D | CODE D |

CODES MAPPED TO PREDICTION PARTS

FIG. 6C

EXAMPLE OF CODED DATA

FIG.7

CODING PROCESS (S10)

CODING PROCESS (S20)

CODING APPARATUS AND METHOD AND STORAGE MEDIUM STORING PROGRAM

BACKGROUND OF THE INVENTION

1. Field of the Invention

The present invention relates to a coding apparatus to which a predictive coding method is applied.

2. Description of the Related Art

As coding methods that exploit autocorrelation of data, for example, run length coding, JPEG-LS, LZ coding (Ziv-Lempel coding), etc. are available. Particularly for image data, adjacent pixels are very closely correlated to each other. Therefore, by taking advantage of such correlation, image data can be coded at a high compression rate.

SUMMARY OF THE INVENTION

The present invention has been made in view of the foregoing background and provides a coding apparatus that achieves a high compression rate, while suppressing image quality deterioration.

[Coding Apparatus]

A coding apparatus includes a color space conversion unit that converts a first image data inputted to the coding apparatus into a second image data which is represented in another color space, a gradation changing unit that changes gradation of the first image data, based on the second image data to generate a third image data, and a predictive coding unit that performs predictive coding on the third image data.

A coding method includes converting input image data to image data which is represented in another color space, changing gradation of the input image data based on the converted image data, and performing predictive coding on the image data subjected to the gradation change.

A storage medium readable by a computer, the storage medium storing a program comprising instructions causing a computer to execute a function includes converting input image data to image data which is represented in another color space, changing gradation of the input image data based on the converted image data; and performing predictive coding on the image data subjected to the gradation change.

BRIEF DESCRIPTION OF THE DRAWINGS

The above and other aspects, features, and advantages of the present invention will be more apparent from the following description of an illustrative embodiment thereof, taken in conjunction with the accompanying drawings, wherein.

DETAILED DESCRIPTION OF THE INVENTION

Background and Overview

To help understanding of the present invention, its background and overview will first be described.

A predictive coding method such as, for example, LZ coding, generates predicted data for a pixel by making reference to pixel values of pixels in predetermined reference positions and, if the predicted data of a reference pixel matches the image data of the pixel of interest, codes the reference position or the like (hereinafter referred to as reference information) of the matched predicted data as data for coding the pixel of interest. The higher is the frequency of occurrence of a match between the predicted data and the data of a pixel of interest (predicted data hit rate), the higher compression rate can be expected.

Therefore, when it is desired to achieve a higher compression rate, a pixel value of a pixel of interest is changed so that the predicted data hit rate will become higher.

However, when such a pixel value change is made, its adverse effect may appear as image quality deterioration. Thus, it is necessary to properly evaluate whether to make a pixel value change.

To properly evaluate image quality deterioration as a result of a pixel value change, an RGB color space which is used for scanned image representation and a CMYK color space which is used for printing or the like are not suitable.

Now, an image processing apparatus 2 in which the present invention is embodied converts input image data to image data in a color space suitable for evaluating the image quality deterioration (for example, a YCbCr color space, Lab color space, etc.) and determines whether to make a pixel value change, based on the converted image data.

[Hardware Configuration]

Then, a hardware configuration of the image processing apparatus 2 of a first embodiment will be described.

Figure 1:
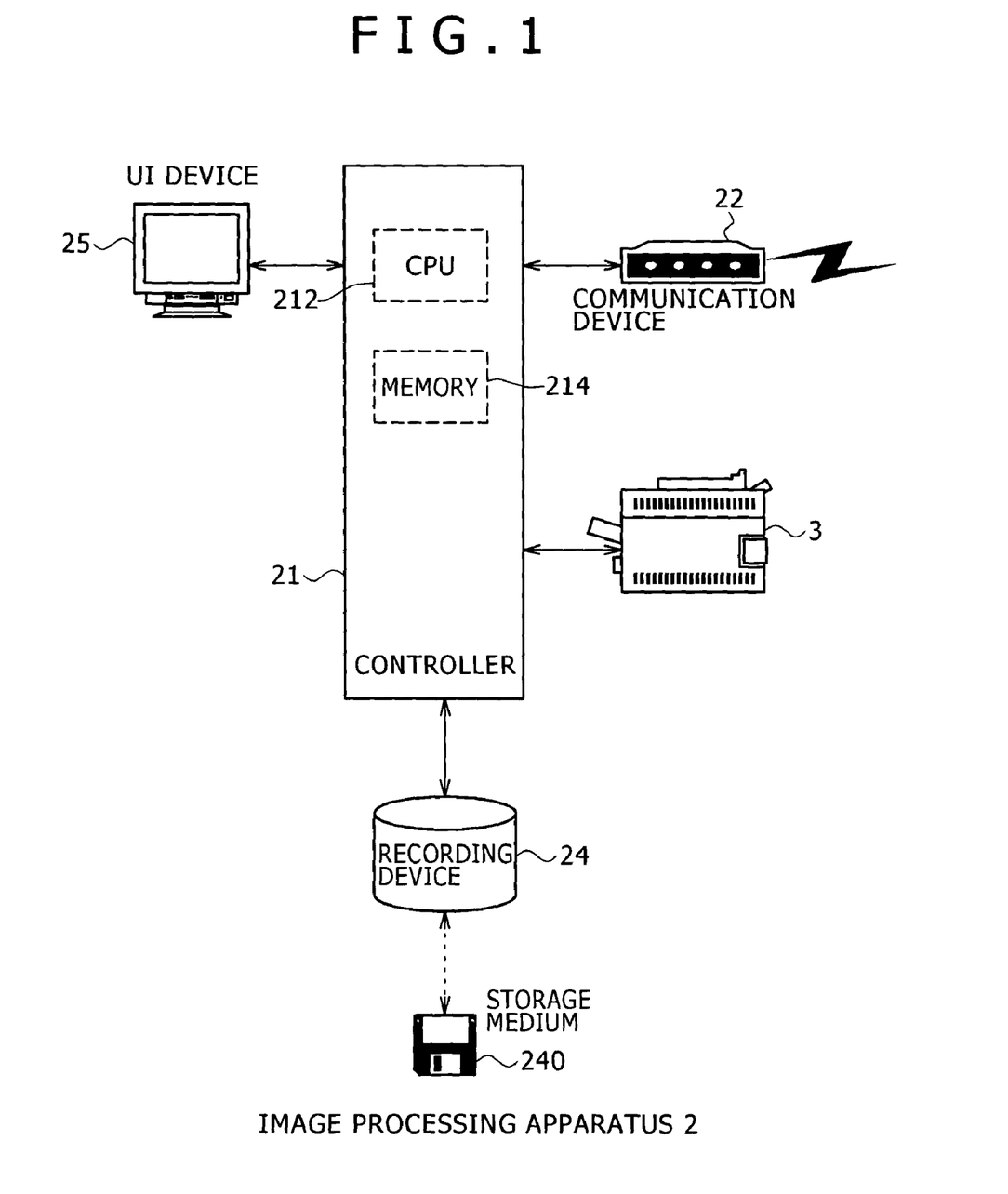
FIG. 1 illustrates a hardware configuration of an image processing apparatus to which a coding method of the present invention is applied, configured with a controller and peripherals.

FIG. 1 illustrates the hardware configuration of the image processing apparatus 2 to which a coding method of the present invention is applied, configured with a controller 21 and peripherals.

As illustrated in FIG. 1, the image processing apparatus 2 is composed of the controller 21 which includes a CPU 212, a memory 214 and other components, a communication device 22, a recording device 24 such as an HDD or CD player, and a user interface (UI) device 25 which includes an LCD display or CRT display with a keyboard, a touch panel, etc.

The image processing apparatus 2 is, for example, a general-purpose computer in which a coding program 5 (which will be described later) involved in the present invention is installed as a part of a printer driver. It acquires image data via the communication device 22 or recording device 24, codes the acquired image data, and sends the coded image data to a printer 3.

[Coding Program]

Figure 2:
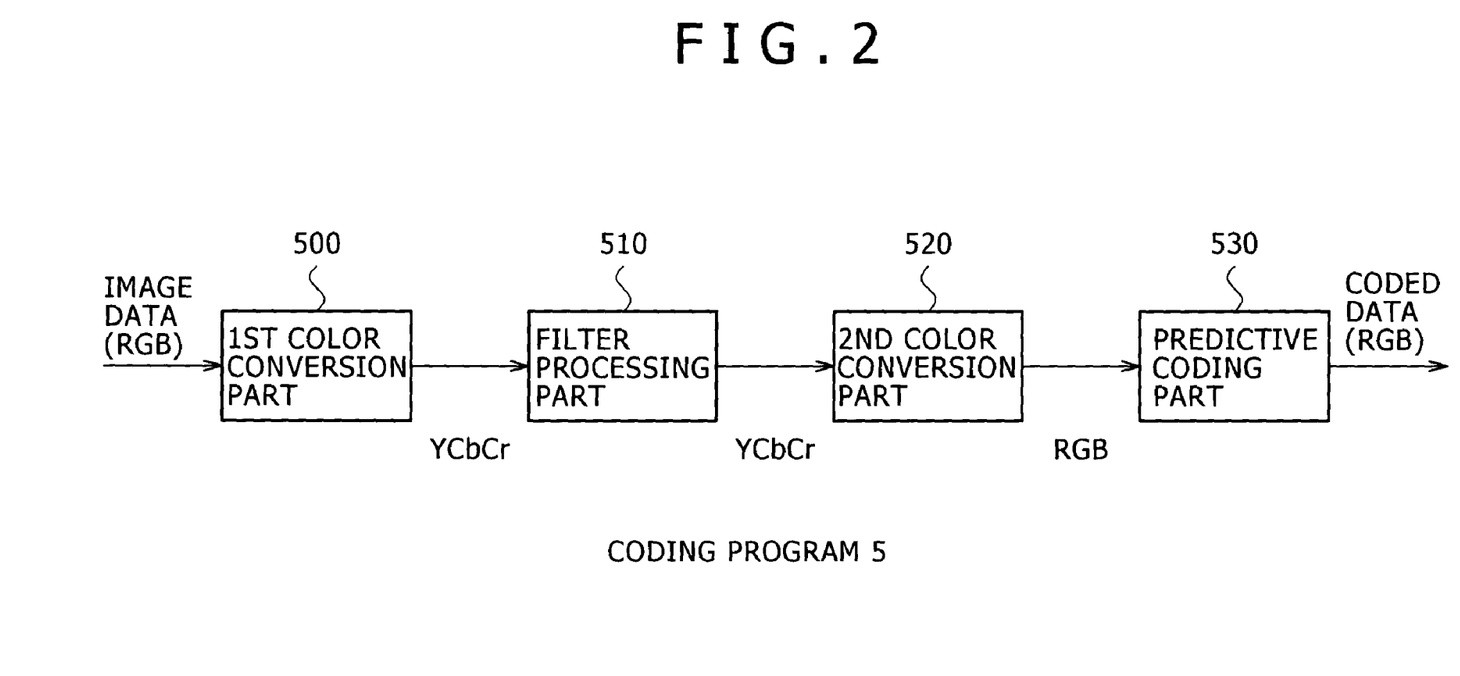
FIG. 2 illustrates a functional structure of a first coding program that implements the coding method of the present invention when executed by the controller (in FIG. 1)

FIG. 2 illustrates a functional structure of a first coding program 5 that implements the coding method of the present invention when executed by the controller 21 (in FIG. 1).

As illustrated in FIG. 2, the first coding program 5 has a first color conversion part 500, a filter processing part 510, a second color conversion part 520, and a predictive coding part 530.

In the coding program 5, the first color conversion part 500 converts input image data (image data represented in a first color space) to image data represented in a second color space.

The first color conversion part 500 (color space conversion unit) may convert image data in a color space that is used for scanning or outputting an image (e.g., the RGB color space, CMYK color space, etc.) to image data in a color space where a luminance component (or lightness component) is separate from other color components (e.g., chrominance components) (such as a YCbCr color space, Lab color space, Luv color space, and Munsell color space).

The first color conversion part 500 in this example converts image data represented in the RGB color space to image data in the YCbCr color space.

The filter processing part 510 (gradation changing unit) carries out a gradation value change operation that changes the gradation range of each color component on the image data (image data in the YCbCr color space in this example) output from the first color conversion part 500. The gradation value change operation in this case is performed independently for plural color components.

More specifically, the filter processing part 510 reduces plural gradation values included in the image data to one gradation value to decrease the amount of the image data. The filter processing part 510 may widen the gradation ranges of the color components substantially evenly.

The gradation value change operation is not needed to be performed evenly across the entire image and a gradation range change may be carried out locally on the image data to reduce the amount of coded data that will be generated finally.

The second color conversion part 520 (color space reconversion unit) converts the image data (image data in the YCbCr color space in this example) in which the gradation range has been changed by the filter processing part 510 into image data in the first color space or a third color space. The third color space may be a color space in which the image data can be decoded properly.

The second color conversion part 520 in this example converts the image data subjected to a gradation range change in the YCbCr color space into image data in the RGB color space. In other words, the second color conversion part 520 makes the image data revert to the image data in the same color space as for the input image data.

The predictive coding part 530 carries out a predictive coding process on the image data (image data in the RGB color space in this example) in the color space converted by the second color conversion part 520 and generates coded data for this image data. The predictive coding process codes the image data for a pixel area of interest by utilizing correlation between the image data for the pixel area of interest and image data for its neighboring reference pixel areas. Therefore, the predictive coding process is capable of, for example, sequential coding on a pixel-by-pixel basis (dot-sequential coding), unlike JPEG image coding or the like which codes image data for each color component plane (plane-sequential coding).

Figure 3:
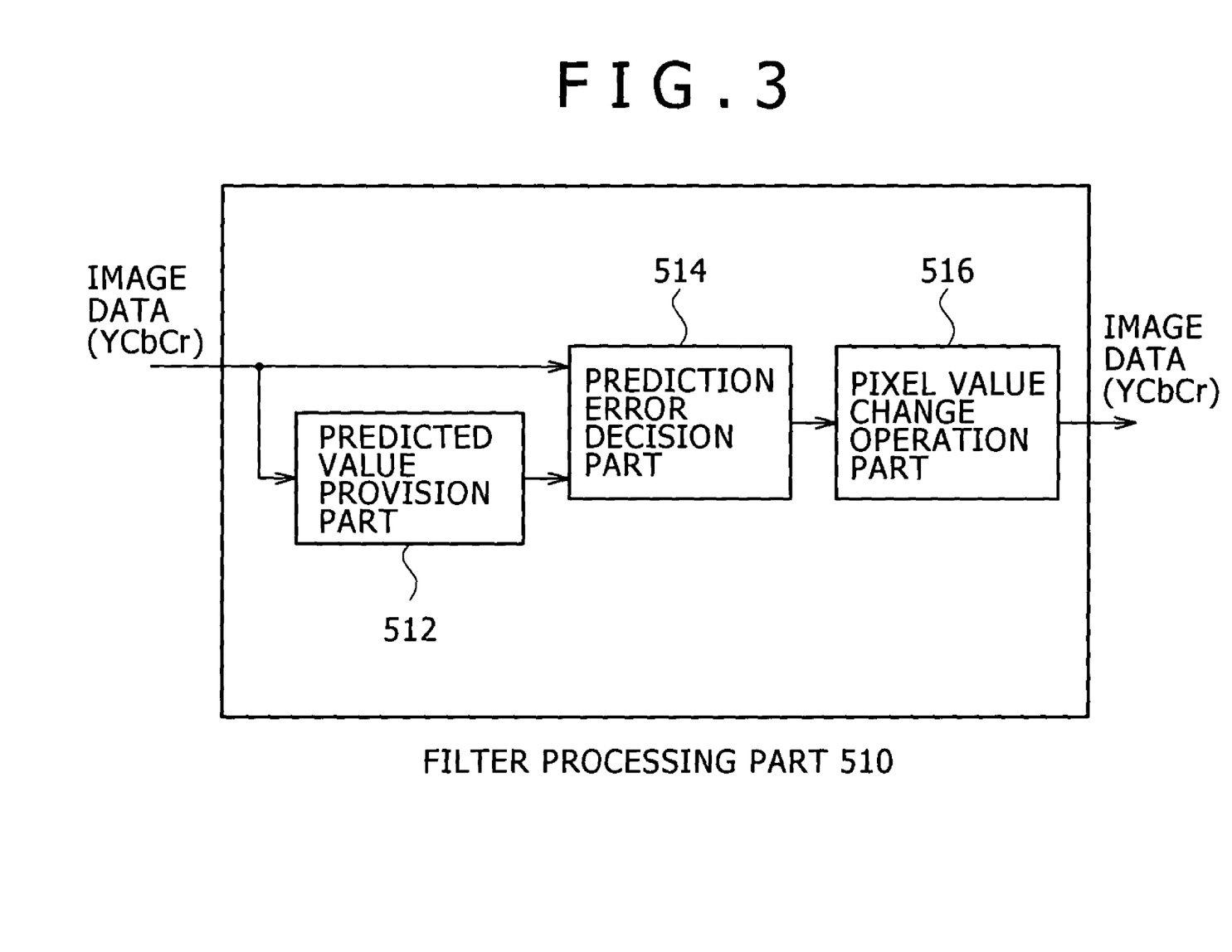
FIG. 3 illustrates a more detailed structure of a filter processing part (FIG. 2)

FIG. 3 illustrates a more detailed structure of the filter processing part 510 (FIG. 2).

As illustrated in FIG. 3, the filter processing part 510 includes a predicted value provision part 512, a prediction error decision part 514, and a pixel value change operation part 516.

The predicted value provision part 512 generates predicted data for a pixel area of interest, based on the image data input from the first color conversion part 500 (FIG. 2), and provides the predicted data to the prediction error decision part 514.

The predicted value provision part 512 in this example generates a predicted value of a pixel of interest in the same manner as done by plural prediction parts 532 (which will be described later with reference to FIG. 5) provided in the predictive coding part 530.

In this way, the filter processing part 510 performs an operation corresponding to the predictive coding process which is performed by the predictive coding part 530 at a later stage, and reduces the amount of coding in cooperation with this predictive coding part 530.

The prediction error decision part 514 compares the image data of the pixel area of interest which has been input from the first color conversion part 500 (FIG. 2) to the predicted data for this pixel area of interest generated by the predicted value provision part 512 and determines whether to change gradation value data for this pixel area of interest.

More specifically, the prediction error decision part 514 calculates a difference between a pixel value (gradation value) of the pixel area of interest and its predicted value (predicted data) of this pixel area of interest and determines whether the calculated difference falls within a predetermined tolerance. If the difference falls within the tolerance, the prediction error decision part 514 determines that the gradation value can be changed; if the difference exceeds the tolerance, it inhibits changing the gradation value.

The prediction error decision part 514 in this example calculates a difference between a pixel value of the pixel of interest and each of plural predicted values for this pixel of interest. If any difference value thus calculated falls within the tolerance, the prediction error decision part 514 permits changing the pixel value of this pixel of interest; if all difference values calculated for this pixel of interest go beyond the tolerance, it inhibits changing the pixel value of this pixel of interest.

The prediction error decision part 514 determines whether to change a gradation value of the pixel area of interest independently for each color component (Y, Cb, and Cr components in this example).

For example, the tolerance of the luminance component (or lightness component) is set narrower than the tolerances of other components (e.g., chrominance components).

In this case, the prediction error decision part 514 in this example calculates a difference between a pixel value of the pixel of interest and its predicted value for each color component and compares the difference value calculated for each color component to the tolerance set for each color component. If the difference values for all color components fall within their tolerances, the prediction error decision part 514 permits a pixel value change of the pixel of interest; if the difference value for any color component goes beyond its tolerance, it inhibits a pixel value change of the pixel of interest.

The prediction error decision part 514 may determine whether to permit or inhibit a pixel value change for each color component, based on the tolerances set for each color component.

The pixel value change operation part 516 changes the gradation values of the pixel area of interest, according to the result of decision made by the prediction error decision part 514.

More specifically, if a gradation value change is permitted by the prediction error decision part 514, the pixel value change operation part 516 changes the gradation values of the pixel area of interest so that a prediction to be made by the predictive coding part 530 (FIG. 2) will hit. If a gradation value change is inhibited by the prediction error decision part 514, the pixel value change operation part 516 outputs the input gradation value data of the pixel area of interest as it is.

If a pixel value change is permitted for all color components by the prediction error decision part 514, the pixel value change operation part 516 in this example replaces the pixel values of the pixel of interest (for all color components) by a predicted value with the smallest difference. If a pixel value change is inhibited for any color component by the prediction error decision part 514, the pixel value change operation part 516 outputs the pixel value data of the pixel of interest as it is.

If the prediction error decision part 514 determines whether to permit or inhibit a pixel value change for each color component, the pixel value change operation part 516 may change the color component values of the pixel for each color component, according to the result of decision made for each color component by the prediction error decision part 514.

Figure 4A:
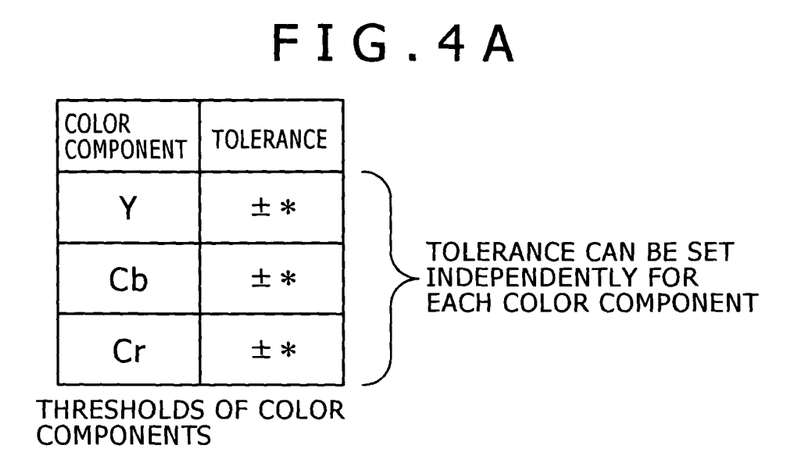
FIGS. 4A and 4B explain a prediction error decision operation by a prediction error decision part (in FIG. 3)
Figure 4B:
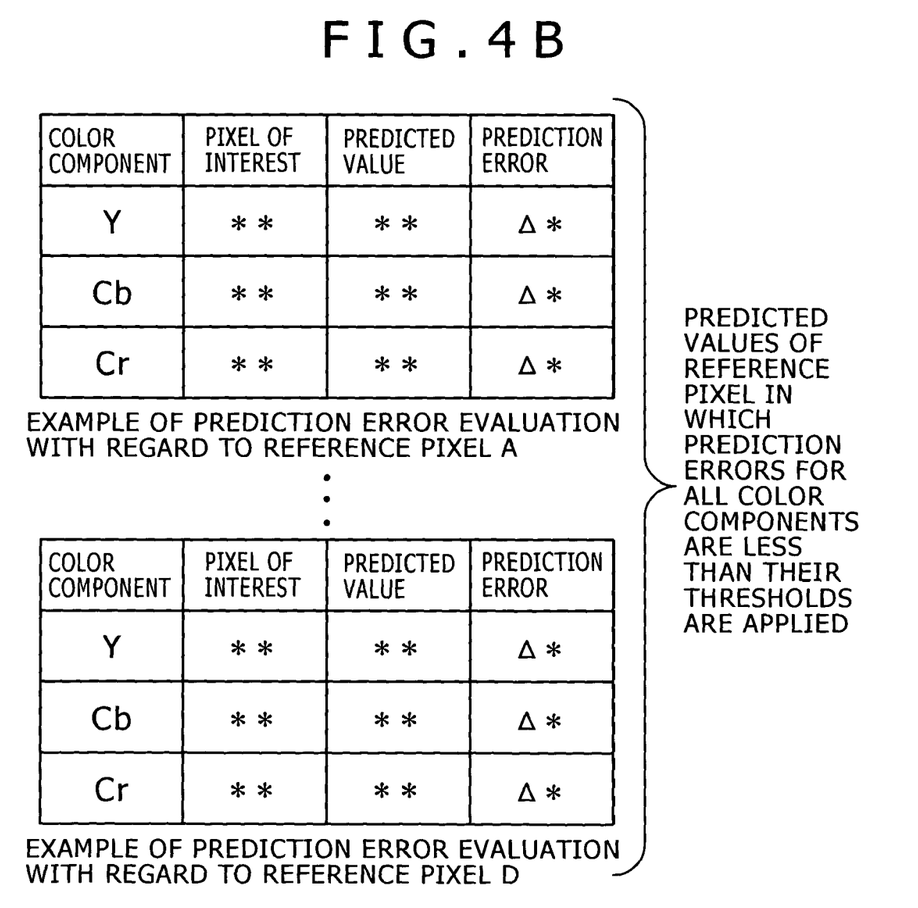

FIGS. 4A and 4B are provided to explain a prediction error decision operation by the prediction error decision part 514 (FIG. 3), wherein FIG. 4A illustrates tolerances set for each color component and FIG. 4B illustrates examples of prediction error evaluation by the prediction error decision part 514.

As illustrated in FIG. 4A, the prediction error decision part 514 sets a tolerance within which a pixel value change is permitted independently for each of Y, Cb, and Cr components. The tolerance for the Y component may be smaller (i.e., a narrower tolerance) than the tolerances for the Cb and Cr components.

As illustrated in FIG. 4B, the prediction error decision part 514 in this example calculates a difference value (prediction error) between a pixel value for each color component of a pixel of interest and the corresponding one of all predicted values for the pixel of interest (pixel values of reference pixels A to D which will be described later with reference to FIG. 6A). Thus, difference values (prediction errors) for Y, Cb, and Cr components of the pixel are calculated.

For a reference pixel, the prediction error decision part 514 compares each of the difference values (prediction errors) thus calculated for the color components to the appropriate one of the tolerances set for each color component (FIG. 4A). If difference values for all color components fall within their tolerances, the prediction error decision part 514 permits a pixel value change of the pixel of interest; if a difference value for any color component is greater than its tolerance, it inhibits a pixel value change for that color component.

As above, the prediction error decision part 514 determines whether to permit or inhibit a pixel value change with regard to each reference pixel (predicted values).

Also, the prediction error decision part 514 in this example, if it determines that a pixel value change can be permitted with regard to plural reference pixels (predicted values), selects one of the reference pixels (predicted values) according to predetermined priority, and notifies the pixel value change operation part 516 of the selected reference pixel (predicted values). Then, the pixel value change operation part 516 replaces the pixel values of the pixel of interest by the pixel values (predicted values) of the reference pixel notified from prediction error decision part 514.

The prediction error decision part 514, if it determines that a pixel value change can be permitted with regard to plural reference pixels (predicted values) may select one of the reference pixels (predicted values) based on the prediction error for one color component and the tolerance set for that color component. For example, the prediction error decision part 514 can calculate a ratio of the prediction error to the tolerance for the Y component for all reference pixels and select a reference pixel (predicted values) in which this ratio of the prediction error to the tolerance is smallest.

Figure 5:
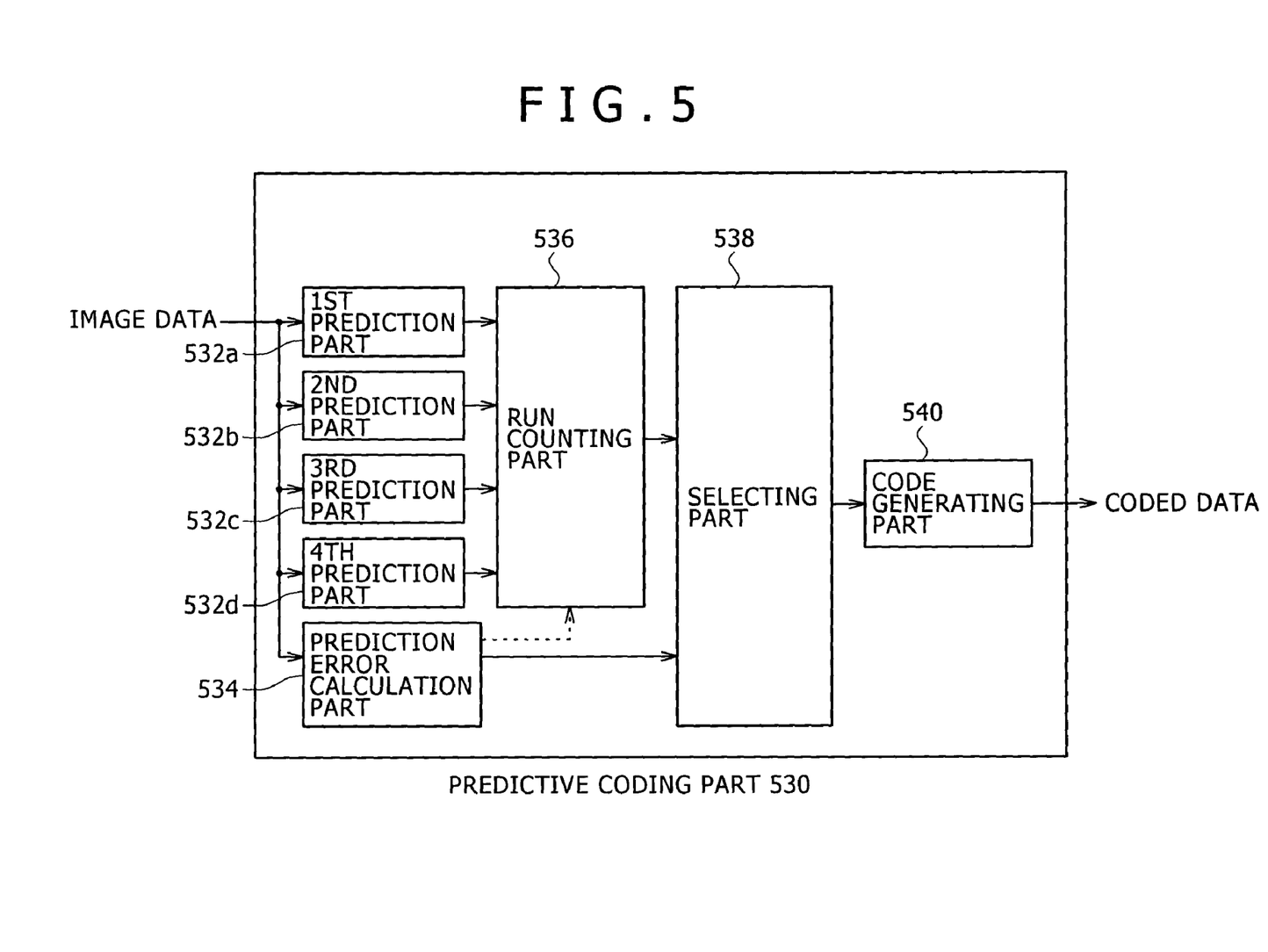
FIG. 5 illustrates a more detailed structure of a predictive coding part (in FIG. 2)

FIG. 5 illustrates a more detailed structure of the predictive coding part 530 (FIG. 2).

As illustrated in FIG. 5, the predictive coding part 530 includes plural prediction parts 532 (a first prediction part 532a, a second prediction part 532b, a third prediction part 532c, and a fourth prediction part 532b), a prediction error calculation part 534, a run counting part 536, a selecting part 538, and a code generating part 540.

For a pixel area of interest, the prediction parts 532 generate predicted data which is the same as the data generated by the predicted value provision part 512 (FIG. 3), compare the generated predicted data to the image data of the pixel area of interest, and output the result of the comparison to the run counting part 536.

Each of the prediction parts 532 in this example refers to the pixel values of a pixel (one of reference pixels) different from the pixel of interest, takes the pixel values as predicted values, and outputs the result of the comparison between the predicted value data and the pixel value data of the pixel of interest to the run counting part 536. More specifically, the first to fourth prediction parts 532a to 532d respectively compare the pixel values of reference pixels A to D (which will be described later with reference to FIG. 6A) to the pixel value data of the pixel X of interest (which will be described later with reference to FIG. 6A). As a result, if pixel value data matching occurs (i.e., a prediction hit occurs), each prediction part outputs its prediction part ID which identifies itself to the run counting part 536. Otherwise, each prediction part outputs a mismatch result to the run counting part 536. Although the plural prediction parts 532 are employed in this example, there may be provided at least one prediction part, for example, only the first prediction part 532a which makes reference to the reference position A.

The prediction error calculation part 534 generates predicted data for the pixel area of interest by a predetermined prediction method, calculates a difference between the generated predicted data and the image data of the pixel area of interest, and outputs the calculated difference as a prediction error to the selecting part 538.

More specifically, the prediction error calculation part 534 predicts pixel values of the pixel of interest, based on the pixel values of a pixel in a predetermined reference position, subtracts the predicted values from the actual pixel values of the pixel of interest, and outputs results as prediction errors to the selecting part 538. The prediction method for the prediction error calculation part 534 is at least required to be correspondingly effected in decoding coded data that is finally generated.

The prediction error calculation part 534 in this example takes the pixel values of the pixel (reference pixel A) in the same reference position as for the first prediction part 532a as predicted values and calculates differences between the predicted values and actual pixel values (of the pixel X of interest).

The run counting part 536 counts successive hits of the same prediction part ID and outputs the prediction part ID and the number of its successive hits to the selecting part 538.

If it happens that none of the results of the prediction parts 532 is match between the predicted values and the pixel values of the pixel of interest, the run counting part 536 in this example outputs the prediction part IDs and the numbers of their successive hits so far counted and held in its internal counter.

Based on the prediction part IDs and the numbers of their successive hits which have been input from the run counting part 536 and the prediction errors input from the prediction error calculation part 534, the selecting part 538 selects a prediction part ID for which the number of successive hits is the greatest and outputs that prediction part ID and the number of its successive hits as well as the prediction errors as predicted data to the code generating part 540.

The code generating part 540 codes a prediction part ID, the number of its successive hits, and prediction errors which have been input from the selecting part 538 and outputs coded data to the communication device 22 (FIG. 1) or the recoding device 24 (FIG. 1) or the like.

Figure 6A:
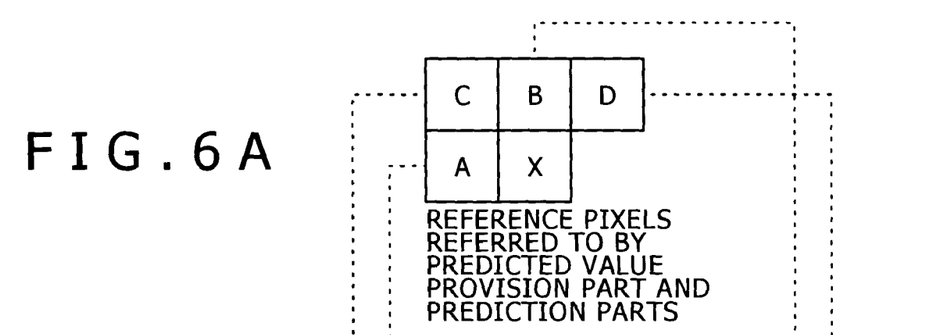
FIGS. 6A, 6B, and 6C explain a coding process that is performed by the predictive coding part (FIG. 5)
Figure 6B:
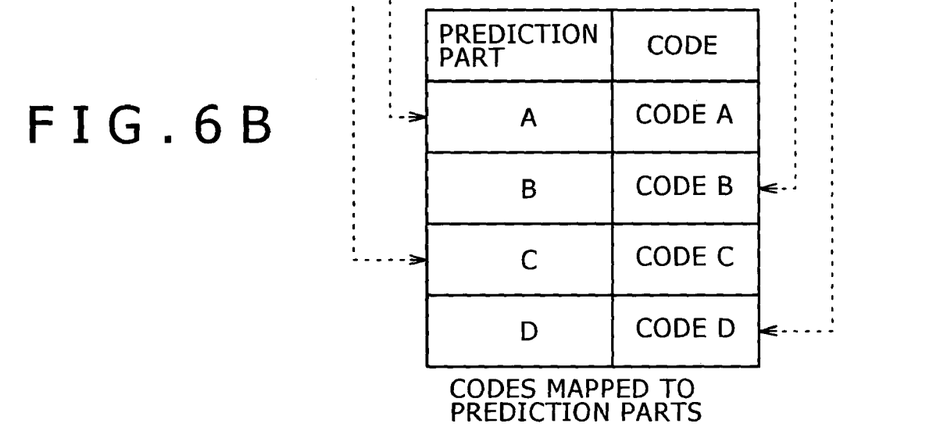
Figure 6C:
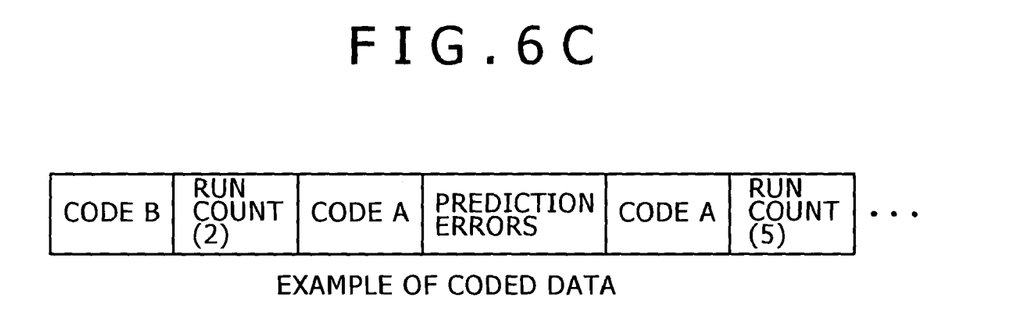

FIGS. 6A through 6C are provided to explain a coding process that is performed by the predictive coding part 530 (FIG. 5), wherein FIG. 6A illustrates the positions of pixels that are referred to by the prediction parts 532, FIG. 6B illustrates codes respectively mapped to the reference pixels, and FIG. 6C illustrates coded data that is generated by the code generating part 540.

As illustrated in FIG. 6A, the pixels that are respectively referred to by the plural prediction parts 532 are positioned relatively to the pixel X of interest. Specifically, the reference pixel A for the first prediction part 532a is positioned at an upstream side (the left) of the pixel X of interest in the fast-scan direction. The reference pixels B to D for the second to fourth prediction parts 532b to 532d are positioned one fast-scan line above the pixel X of interest (upstream in the slow-scan direction).

The predicted value provision part 512 (FIG. 3) in the filter processing part 510 also takes the pixel values of the reference pixels A to D as predicted values for the pixel X of interest in the same manner as done by the prediction parts 532 and provides the predicted values to the prediction error decision part 514.

As illustrated in FIG. 6B, codes are respectively mapped to the reference pixels A to D.

If a prediction made by any prediction part 532 (for its reference pixel) hits, the run counting part 536 (FIG. 5) increments the number of successive hits of the ID of the prediction part 532 (its reference pixel) which has made the prediction hit. If predictions made by all prediction parts 532 (for their reference pixels) do not hit, the run counting part 536 outputs the counted numbers of successive hits of prediction part IDs to the selecting part 538.

The code generating part 540 has mappings between the prediction parts 532 (reference positions) and the codes as illustrated in FIG. 6B and outputs a code mapped to a reference position whose pixel value data matches with the corresponding data of the pixel X of interest. The codes mapped to the reference positions are entropy codes that have been set according to the hit rate of each reference position and a code length is determined, depending on the hit rate.

If pixel value data matching with the data of the pixel X of interest continuously occurs in one reference position, the code generating part 540 codes the number of successive hits (run count) of the ID of the prediction part for the reference position counted by the run counting part 536. This reduces the amount of codes to be output. In this way, when pixel value data matching with the data of the pixel X of interest occurs in any reference position, the coding program 5 applies the code mapped to the reference position, if the matching continues, codes the count of successive matches in the same reference position, and, if no pixel value data matching occurs in any reference position, codes the differences (prediction errors) between the pixel values of the pixel in the predetermined reference position and the pixel values of the pixel X of interest, as illustrated in FIG. 6C.

Figure 7:
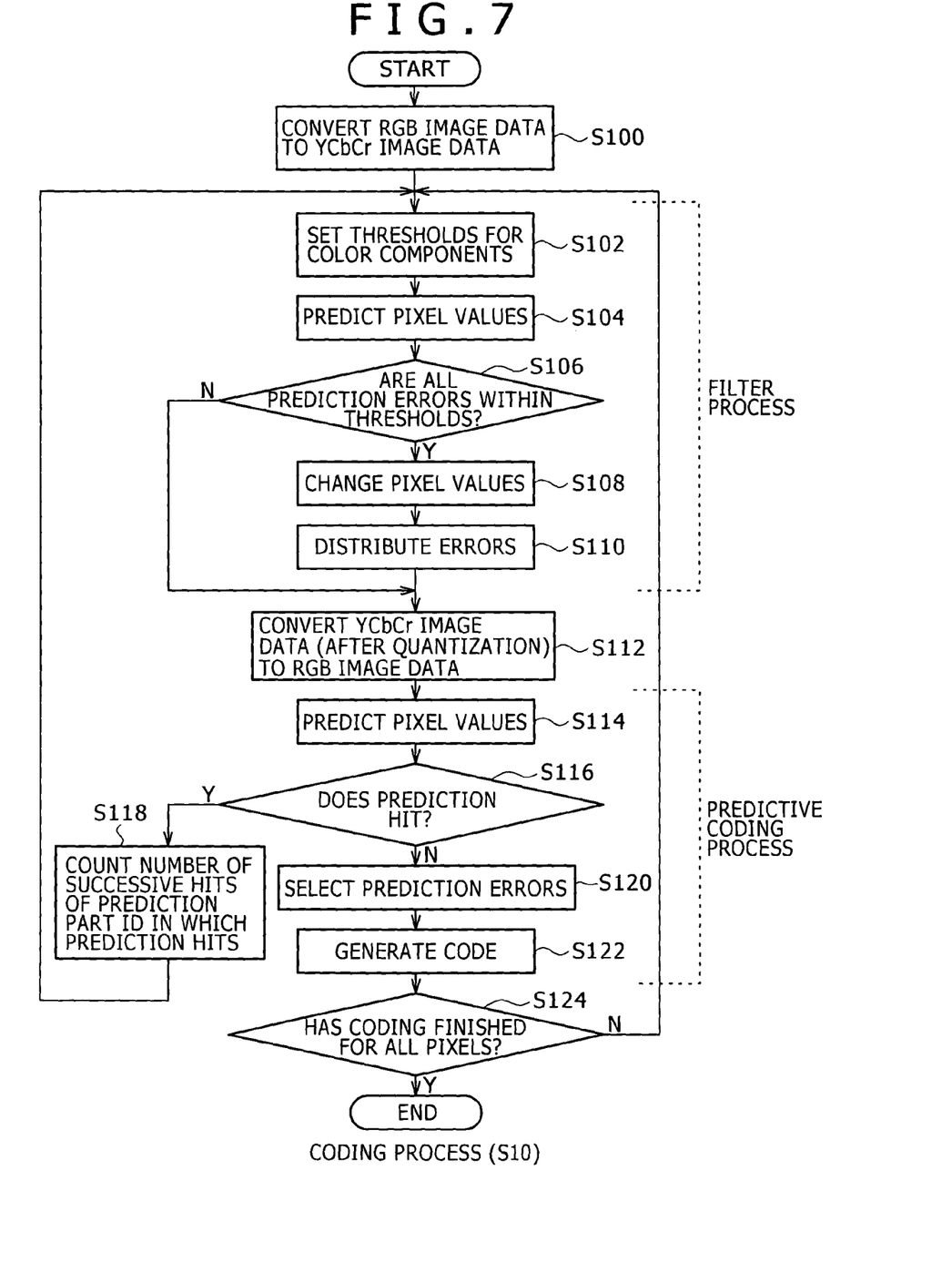
FIG. 7 is a flowchart of a coding process by the coding program (FIG. 2)

FIG. 7 is a flowchart of a coding process (S10) by the coding program 5 (FIG. 2).

As illustrated in FIG. 7, at step 100 (S100), the first color conversion part 500 (FIG. 2) converts input image data (image data in the RGB color space) to image data in the YCbCr color space and outputs the converted image data (image data in the YCbCr color space) to the filter processing part 510.

At step 102 (S102), the filter processing part 510 (FIG. 2) sets a pixel X of interest by reading order from the image data input from the first color conversion part 500. The pixel values of the pixel X of interest include a Y component pixel value, a Cb component pixel value, and a Cr component pixel value.

The prediction error decision part 514 (FIG. 3) in the filter processing part 510 reads the tolerances for the Y, Cb, and Cr components from a table prepared in advance.

The prediction error decision part 514 may set the tolerances for each color component (Y, Cb, and Cr components), according to entered image attributes.

At step 104 (S104), the predicted value provision part 512 generates plural predicted data pieces by referring to plural reference pixels A to D for the pixel of interest and outputs the generated predicted data to the prediction error decision part 514. The generated predicted data includes predicted values for each color component.

At step 106 (S106), the prediction error decision part 514 (FIG. 3) calculates differences (prediction errors) between the predicted values input from the predicted value provision part 512 and the corresponding pixel values of the pixel of interest for each reference pixel and each color component.

Then, the prediction error decision part 514 compares the differences (prediction errors) calculated for each reference pixel and each of the plural color components to the tolerances set for these color components. With regard to a reference pixel, if the differences for all color components fall within the tolerances, the prediction error decision part 514 permits a pixel value change based on that reference pixel; if the difference for any color component goes beyond its tolerance, it inhibits a pixel value change based on that reference pixel.

If a pixel value change is permitted with regard to at least one reference pixel, the prediction error decision part 514 selects that one reference pixel and notifies the pixel value change operation part 516 of the selected reference pixel. Then, the process proceeds to step S108. If a pixel value change is inhibited for all reference pixels, the prediction error decision part 514 outputs the pixel value data of the pixel of interest as it is to the second color conversion part 520 (FIG. 2). Then, the process proceeds to step S112.

At step 108 (S108), the pixel value change operation part 516 (FIG. 3) replaces the pixel values (including Y, Cb, and Cr component values) of the pixel of interest by the pixel values (including Y, Cb, and Cr component values) of the reference pixel notified from the prediction error decision part 514 and outputs the pixel values to the second color conversion part 520.

At step 110 (S110), the pixel value change operation part 516 distributes errors resulting from the pixel value replacement (that is, differences between the pixel values of the reference pixel selected by the prediction error decision part 514 and the pixel values of the pixel of interest) to the pixels surrounding the pixel of interest.

This suppresses tone unevenness by the pixel value change in the whole image.

At step 112 (S112), the second color conversion part 520 (FIG. 2) changes the pixel values (for Y, Cb, and Cr components) of the pixel of interest, which have been input from the filter processing part 510, to corresponding pixel values in the RGB color space and outputs the changed pixel values of the pixel of interest (image data in the RGB color space) to the predictive coding part 530.

At step 114 (S114), the plural prediction parts 532 (FIG. 5) provided in the predictive coding part 530 generate predicted data (for R, G, and B components) for the pixel of interest, based on the pixel values in the RGB color space (that is, the pixel values of the pixel of interest and the pixel values in an already processed image area) which have been input from the second color conversion part 520.

Also, the prediction error calculation part 534 (FIG. 5) calculates differences (for R, G, and B components) between the pixel values of the pixel of interest and the pixel values of the reference pixel A and outputs the calculated differences as prediction errors to the selecting part 538.

At step 116 (S116), each prediction part 532 (FIG. 5) compares the generated predicted data (for R, G, and B components) to the pixel values (for R, G, and B components) of the pixel of interest, determines whether a match occurs, and outputs the result of the decision (the prediction part ID if the match occurs or a mismatch result) to the run counting part 536.

If the match between the pixel values of the pixel of interest and the predicted data occurs in any prediction part 532, the coding program 5 proceeds to step S118. If the match does not occur in any of the prediction parts 532, the coding program 5 proceeds to step S120.

At step 118 (S118), the run counting part 536 (FIG. 5), when taking a prediction part ID input from any prediction part 532, increments the count value for the prediction part ID by one.

Then, the coding program 5 returns to S102 to perform the process for the next pixel of interest.

At step 120 (S120), upon detecting that no prediction hits occur in any of the prediction parts 532, according to the results input from the prediction parts 532, the run counting part 536 outputs respective counts of all prediction part IDs to the selecting part 538.

When taking the input of the count values of all prediction part IDs from the run counting part 536, the selecting part 538 calculates the greatest number of successive hits of a prediction part ID from the count values which have been input and outputs the calculated greatest number of successive hits and the prediction part ID to the code generating part 540.

Then, the selecting part 538 outputs the prediction errors (prediction errors for the pixel of interest for which no hits have occurred with the predictions made by any of the prediction parts 532), which have been input from the prediction error calculation part 534, to the code generating part 540.

At step 122 (S122), the code generating part 540 (FIG. 5) codes the prediction part ID, the number of successive hits, and the prediction errors which have been input in order from the selecting part 538 and outputs the coded data to the communication device 22 (FIG. 1) or the recoding device 24 (FIG. 1).

At step 124 (S124), the coding program 5 determines whether coding has finished for all pixels in the input image data. If there are one or more pixels for which coding is unfinished, the program returns to step S102 and repeats the process for the next pixel of interest; otherwise, it terminates the coding process (S10).

As described above, the image processing apparatus 2 of this embodiment converts input image data to image data in the color space where the luminance component (or lightness component) is separate from other color components, compares predicted data for each color component to actual image data, and determines whether to change the image data (gradation values).

When pixel values are changed, the degree of image quality deterioration differs between the luminance component (or lightness component) and other color components. Since the image processing apparatus 2 of this embodiment can evaluate whether to make a pixel value change independently for each of the color components, it can achieve a high compression rate while suppressing image quality deterioration.

Also, the image processing apparatus 2 of this embodiment converts the image data in which pixel values have been changed (quantized) by the filter processing part 510 to image data in the color space (RGB color space in this example) where the image data can be decoded.

Thereby, the apparatus can maintain compatibility with conventional coding and decoding methods.

First Modification Example

Next, a first example of modification to the foregoing embodiment will be described.

In the foregoing embodiment, not only the prediction error decision operation by the prediction error decision part 514 but also the pixel value change operation by the pixel value change operation part 516 is performed in the YCbCr color space; however, the coding process of the present invention is not limited so.

In the first modification example, the prediction error decision operation by the prediction error decision part 514 is performed in the YCbCr color space and the pixel value change operation by the pixel value change operation part 516 is performed in the RGB color space (the color space for the input image data).

Figure 8:
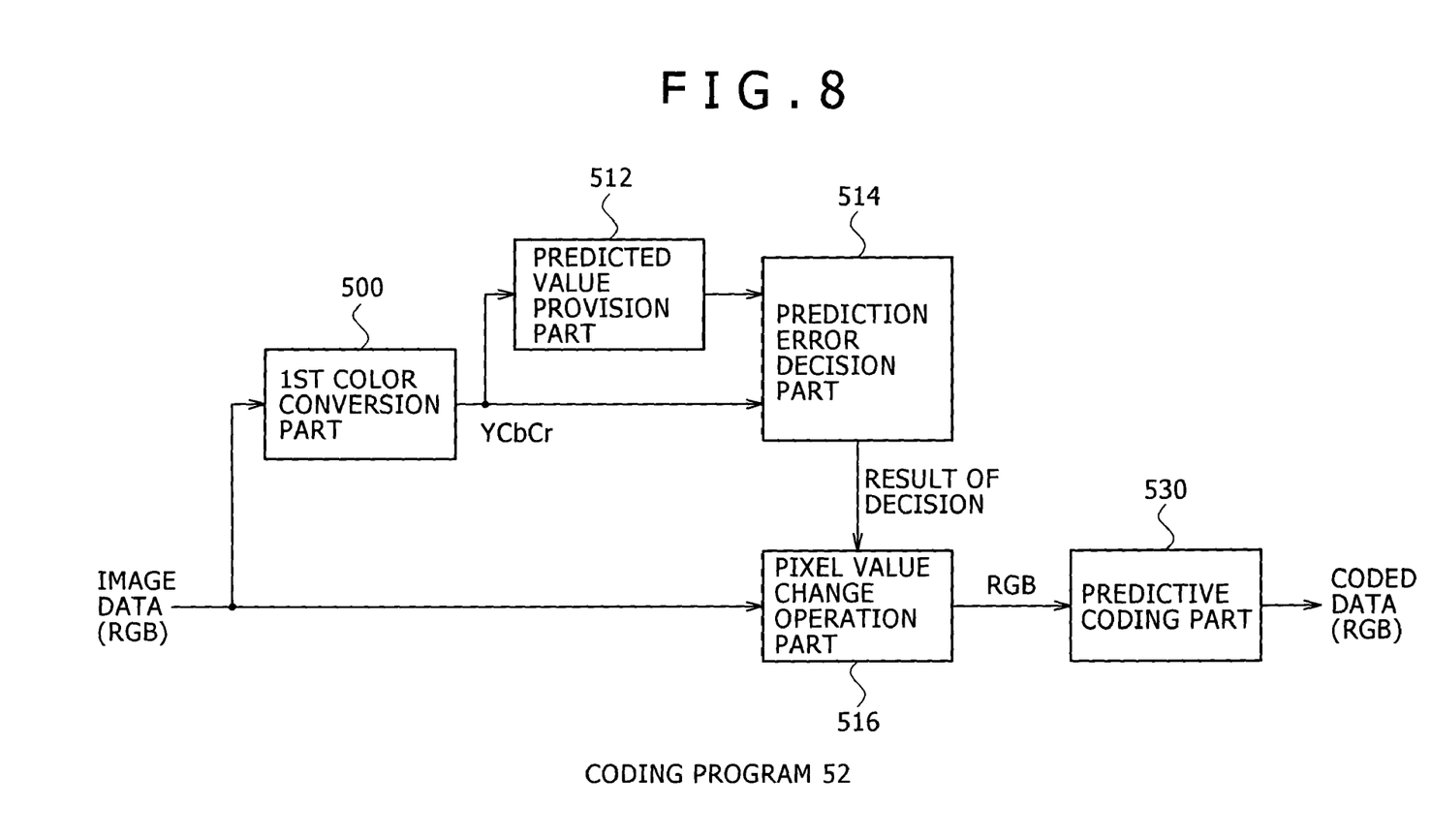
FIG. 8 illustrates a structure of a second coding program.

FIG. 8 illustrates a structure of a second coding program 52. Program components as shown in this figure, which are substantially identical to the components shown in FIG. 2 or FIG. 3, are assigned the same reference numbers.

As shown in FIG. 8, the second coding program 52 has a first color conversion part 500, a predicted value provision part 512, a prediction error decision part 514, a pixel value change operation part 516, and a predictive coding part 530.

The prediction error decision part 514 in this modification example determines whether to permit or inhibit a pixel value change, based on image data in the YCbCr color space, and outputs the result of the decision (it permits or inhibits a pixel value change) to the pixel value change operation part 516.

The pixel value change operation part 516 in this modification example changes the pixel values of input image data (in the RGB color space), according to the result of the decision which is input from the prediction error decision part 514.

Therefore, this modification example dispenses with the second color conversion part 520.

In this way, the coding program 52 of the first modification example only determines whether to change gradation values (pixel values) in the YCbCr color space and performs changing gradation values (pixel values) and the predictive coding process in the color space for the input image data. Therefore, it is not needed to change again image data in the YCbCr color space to image data in another color space (the RGB color space or any other suitable color space).

Second Modification Example

Next, a second modification example will be described.

In the foregoing embodiment, not only the prediction error calculation part 534 calculates prediction errors in the RGB color space but also the prediction parts 532 make a decision of whether a prediction hits in the RGB color space; however, the coding process of the present invention is not limited so.

In the second modification example, the prediction error calculation part 534 calculates prediction errors in the RGB color space and the prediction parts 532 determine whether a prediction hits in the YCbCr color space.

In other words, the image processing apparatus 2 in the second modification example converts image data in the YCbCr color space to image data in the RGB color space only in a case where prediction errors are calculated by the prediction error calculation part 534.

Figure 9:
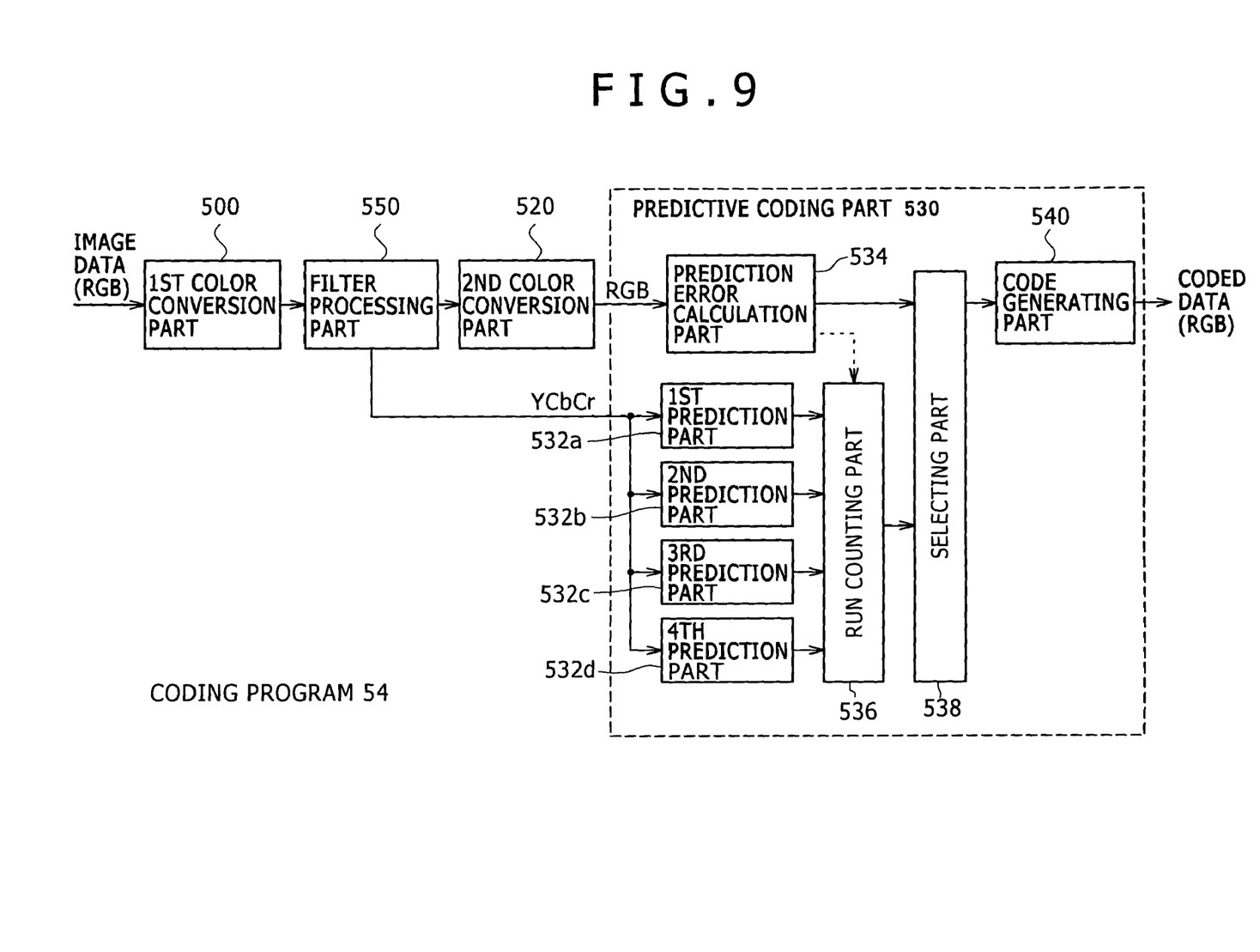
FIG. 9 illustrates a structure of a third coding program.

FIG. 9 illustrates a structure of a third coding program 54. Program components as shown in this figure, which are substantially identical to the components shown in FIG. 2 or FIG. 5, are assigned the same reference numbers.

As illustrated in FIG. 9, the third coding program 54 has the structure in which a second filter processing part 550 replaces the first filter processing part 510 in the first coding program 5 (FIG. 2).

The second filter processing part 550 outputs image data (in the YCbCr color space), input from the first color conversion part 500, to the second color conversion part 520 or the prediction parts 532 in the predictive coding part 530, according to the result of the decision made by the prediction error decision part 514. More specifically, if the differences between the pixel values of the pixel of interest and the predicted values fall within the tolerances (that is, if a prediction part ID or the number of its successive hits is be coded), this filter processing part 550 outputs the input image data (in the YCbCr color space) to the prediction parts 532. If the above differences go beyond the tolerances (that is, if prediction errors are to be coded), the filter processing part 550 outputs the input image data (in the YCbCr color space) to the second color conversion part 520.

Figure 10:
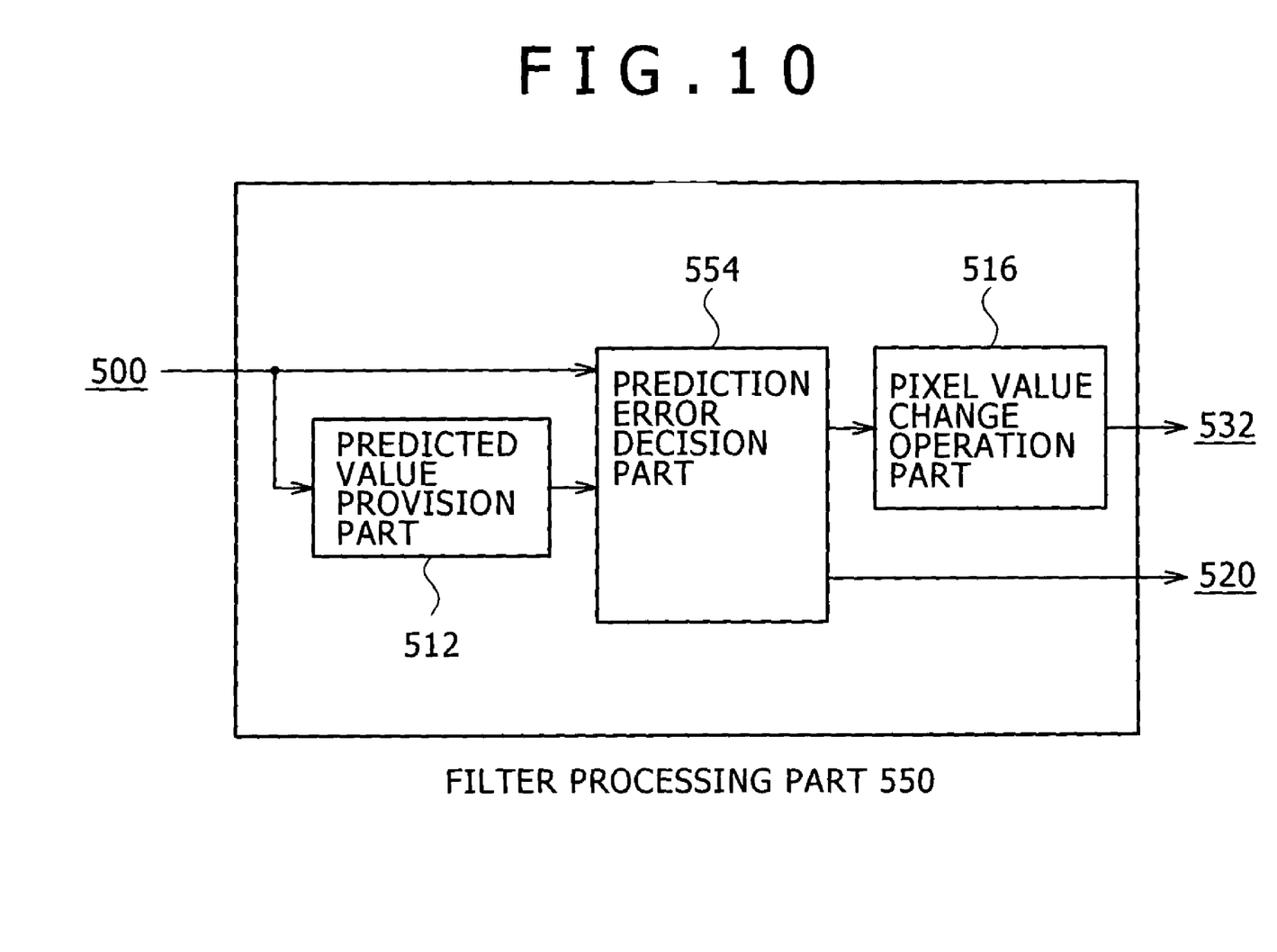
FIG. 10 illustrates a more detailed structure of a second filter processing part.

FIG. 10 illustrates a more detailed structure of the second filter processing part 550. Components as shown in this figure, which are substantially identical to the components shown in FIG. 3, are assigned the same reference numbers.

As shown in FIG. 10, the second filter processing part 550 has the structure in which a second prediction error decision part 554 replaces the first prediction error decision part 514 in the first filter processing part 510 (FIG. 3).

The second prediction error decision part 554 calculates difference values between the pixel values of the pixel of interest and plural predicted values for this pixel of interest respectively. If any of the calculated difference values falls within its tolerance, it permits changing the pixel values of this pixel of interest and outputs the pixel values of this pixel of interest to the pixel value change operation part 516.

In this case, the pixel values of the pixel of interest (YCbCr) are to be replaced by their predicted values (YCbCr) within the tolerances. Since these predicted values are the same as the ones to be generated by the prediction parts 532 in the following stage, a prediction hit will surely occur in any of the prediction part 532.

Consequently, a prediction part ID that has made a prediction hit or the number of its successive hits is coded for this pixel of interest, instead of its actual pixel values, as the same code regardless of whether the color space for the image data is the YCbCr color space or RGB color space.

Meanwhile, if all the difference values calculated for this pixel of interest go beyond their tolerances, the filter processing part 550 inhibits changing the pixel values of this pixel of interest and outputs the pixel values of this pixel of interest to the second color conversion part 520 (FIG. 9).

In this case, the pixel values (YCbCr) of the pixel of interest are converted to those in the RGB color space by the second color conversion part 520. Thus, the prediction error calculation part 534 calculates prediction errors for the pixel values in the RGB color space and coded data based on the RGB color space is generated.

Figure 11:
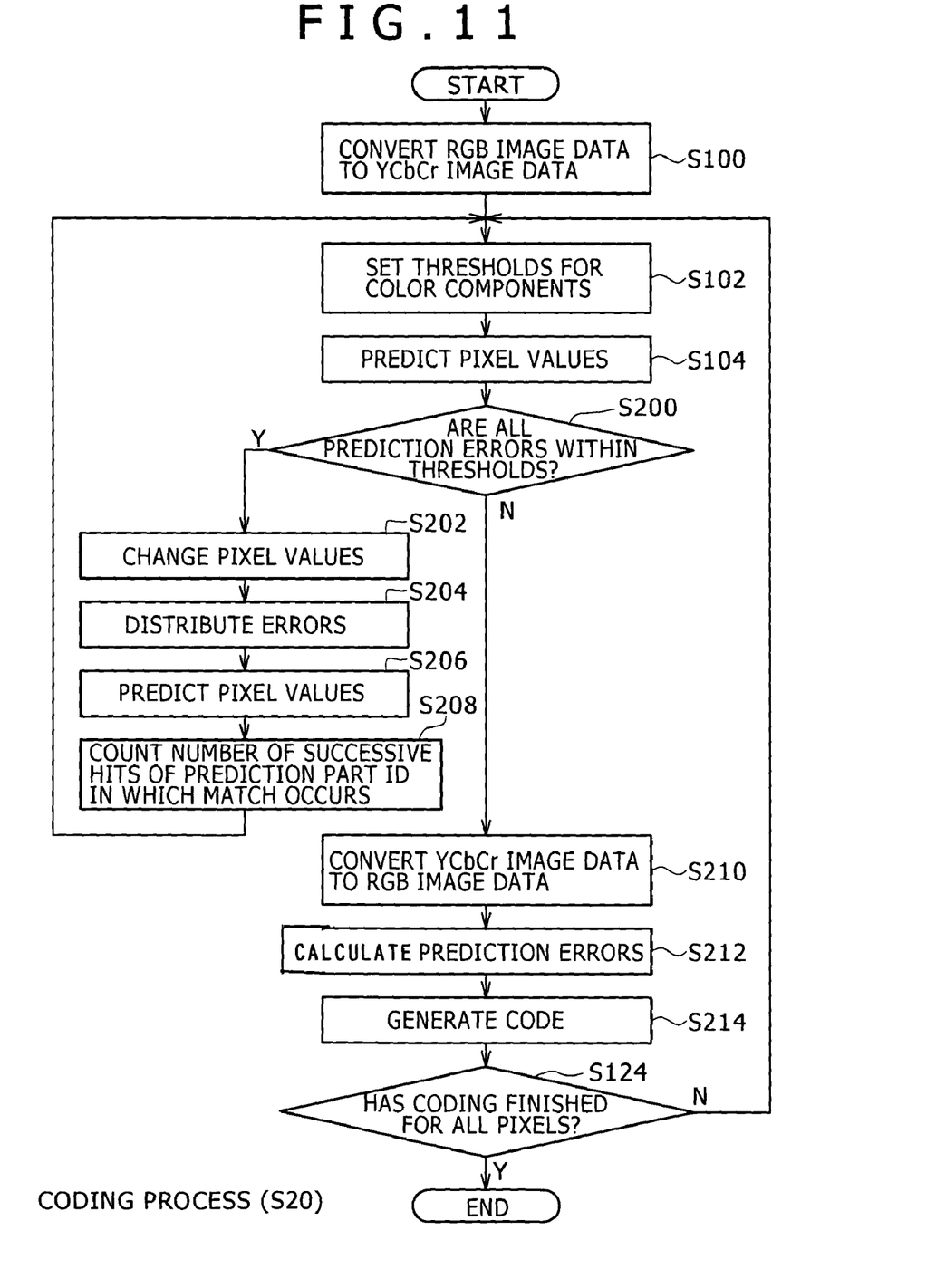
FIG. 11 is a flowchart of a coding process by the third coding program (FIG. 9).

FIG. 11 is a flowchart of a coding process (S20) by the third coding program 54 (FIG. 9). Steps shown in this figure, which are substantially identical to those shown in FIG. 7, are assigned the same reference numbers.

As shown in FIG. 11, at step S100, the first color conversion part 500 (FIG. 9) converts input image data (in the RGB color space) to image data in the YCbCr color space and outputs the converted image data (in the YCbCr color space) to the filter processing part 550.

At step S102, the filter processing part 550 (FIG. 9 and FIG. 10) set a pixel X of interest by reading order from the image data input from the first color conversion part 500.

The prediction error decision part 554 (FIG. 10) in the filter processing part 550 reads the tolerances for the Y, Cb, and Cr components from a table prepared in advance.

At step S104, the predicted value provision part 512 (FIG. 10) generates plural predicted data pieces by referring to plural reference pixels A to D for the pixel of interest and outputs the generated predicted data to the prediction error decision part 554. The generated predicted data includes predicted values for each color component.

At step 200 (S200), the prediction error decision part 554 (FIG. 10) calculates differences (prediction errors) between the predicted values input from the predicted value provision part 512 and the corresponding pixel values of the pixel of interest for each reference pixel and each color component.

Then, the prediction error decision part 554 compares the differences (prediction errors) calculated for each reference pixel and each of the plural color components to the tolerances set for these color components. With regard to a reference pixel, if the differences for all color components fall within the tolerances, the prediction error decision part 554 permits a pixel value change based on that reference pixel; if the difference for any color component is greater than its tolerance, it inhibits a pixel value change based on that reference pixel.

If a pixel value change is permitted with regard to at least one reference pixel, the prediction error decision part 554 selects that one reference pixel, notifies the pixel value change operation part 516 of the selected reference pixel, and outputs the pixel values (YCbCr) of the pixel of interest to the pixel value change operation part 516. Then, the process proceeds to step S202.

If a pixel value change is inhibited for all reference pixels, the prediction error decision part 554 outputs the pixel values (YCbCr) of the pixel of interest as it is to the second color conversion part 520 (FIG. 9). Then, the process proceeds to step S210.

At step 202 (S202), the pixel value change operation part 516 (FIG. 10) replaces the pixel values (YCbCr) of the pixel of interest by the pixel values (YCbCr) of the reference pixel notified from the prediction error decision part 554 and outputs the pixel values to the prediction parts 532 (FIG. 9).

At step 204 (S204), the pixel value change operation part 516 (FIG. 10) distributes errors (YCbCr) resulting from the pixel value replacement to the pixels surrounding the pixel of interest.

At step 206 (S206), the plural prediction parts 532 (FIG. 9) provided in the predictive coding part 530 generate predicted data (YCbCr) for the pixel of interest, based on the pixel values in the YCbCr color space which have been input from the filter processing part 550.

Also, each prediction part 532 (FIG. 9) compares the generated predicted data (YCbCr) to the pixel values (YCbCr) of the pixel of interest, determines whether a match occurs, and outputs the result of the decision (the prediction part ID if the match occurs or a mismatch result) to the run counting part 536.

In this modification example, it is ensured that a prediction hit occurs in any of the prediction parts 532.

At step 208 (S208), the run counting part 536 (FIG. 9), when taking a prediction part ID input from any of the prediction parts 532, increments the count value for the prediction part ID by one.

Then, the coding program 54 returns to S102 to perform the process for the next pixel of interest.

At step 210 (S210), the second color conversion part 520 (FIG. 9) converts the pixel values (YCbCr) of the pixel of interest, input from the filter processing part 550 (prediction error decision part 554 (FIG. 10)), and the pixel values (YCbCr) of a reference pixel which is referred to for obtaining prediction errors into pixel values in the RGB color space, and outputs the converted pixel values (RGB) to the prediction error calculation part 534 (FIG. 9).

At step 212 (S212), the prediction error calculation part 534 calculates prediction errors (RGB) based on the pixel values (RGB) which have been input from the second color conversion part 520, and outputs the calculated prediction errors to the selecting part 538.

The coding program 54 in this example converts image data (YCbCr) to image data in the RGB color space and calculates prediction errors, based on the converted image data (RGB). However, the coding process of the present invention is not limited so. For instance, it is possible to calculate prediction errors, based on image data in the YCbCr color space, and convert the calculated prediction errors (YCbCr) to the corresponding values (prediction errors) in the RGB color space.

At step 214 (S214), the selecting part 538 (FIG. 9), when taking the input of the prediction errors from the prediction error calculation part 534, reads respective counts of all prediction part IDs from the run counting part 536.

Then, the selecting part 538 calculates the greatest number of successive hits of a prediction part ID from the count values that have been read from the run counting part 536 and outputs the calculated greatest number of successive hits and the prediction part ID to the code generating part 540. Then, it outputs the prediction errors (RGB) which have been input from the prediction error calculation part 534 to the code generating part 540.

The code generating part 540 (FIG. 9) codes the prediction part ID, the number of successive hits, and the prediction errors which have been input in order from the selecting part 538 and outputs the coded data to the communication device 22 (FIG. 1) or the recoding device 24 (FIG. 1).

At step S124, the coding program 54 determines whether coding has finished for all pixels in the input image data. If there are one or more pixels for which coding is unfinished, the program returns to step S102 and repeats the process for the next pixel of interest; otherwise, it terminates the coding process (S20).

In this way, in the image processing apparatus 2 in the second modification example, image data reconversion is executed by the second color conversion part 520 only in a case where prediction errors are calculated (that is, if the differences between the pixel values of the pixel of interest and the predicted values go beyond the tolerances). In this software processing, coding can be performed at a higher speed than in the foregoing embodiment.

Other Modification Examples

The filter processing part 510 (FIG. 2) in the foregoing embodiment determines whether the differences between the pixel values of the pixel of interest and the predicted values fall within the tolerances for each color component and changes the pixel values of the pixel of interest, according to the result of the decision. However, the coding process of the present invention is not limited so. For instance, it is possible to change the pixel values of the pixel of interest without determining whether the differences between the pixel values of the pixel of interest and the predicted values fall within the tolerances.

For instance, the filter processing part 510 may only round the image data (e.g., round to integer pixel values) converted by the first conversion part 500.

In ordinary image data, luminance component (or lightness component) values often spread more widely than values of chrominance components. In other words, hue component values are dense in a narrower range.

Therefore, for example, when image data in the RGB color space is converted to image data in the YCbCr color space and Y component values and Cb or Cr component values, after converted, are rounded by the same rounding scheme (truncating, rounding out, or rounding off the values to a specified number of digits), the effect of the rounding differs between Y component values and other component values. That is, the effect of the rounding is greater for Cb or Cr component values than for Y component values. In other words, uniform rounding for Y, Cb, and Cr component values has the same effect as Cb or Cr component values are quantized more effectively than Y component values.

As described above, a coding apparatus includes a color space conversion unit that converts input image data into image data which is represented in another color space, a gradation changing unit that changes gradation of the input image data, based on the converted image data, and a predictive coding unit that performs predictive coding on the image data subjected to the gradation change.

The gradation changing unit may determine whether to change gradation values of the input image data, based on the image data converted by the color space conversion unit.

The gradation changing unit may change gradation values of the image data converted by the color space conversion unit.

The color space conversion unit may convert the input image data into image data in a color space composed of a luminance or lightness component and other color components.

The coding apparatus may further include a color space reconversion unit that converts the image data subjected to the gradation value change into image data in the same color space as for the input image data, and the predictive coding unit may perform the predictive coding on the image data converted by the color space reconversion unit.

The input image data may be represented in an RGB color space, the color space conversion unit may convert the input image data represented in the RGB color space to image data represented in another color space, and the color space reconversion unit may convert the image data subjected to the gradation change by the gradation changing unit to image data represented in the RGB color space.

The gradation changing unit may change a gradation range of at least one of color components of the predetermined color space.

A coding method includes converting input image data to image data which is represented in another color space, changing gradation of the input image data based on the converted image data, and performing predictive coding on the image data subjected to the gradation change.

A storage medium readable by a computer, the storage medium storing a program comprising instructions causing a computer to execute a function includes converting input image data to image data which is represented in another color space, changing gradation of the input image data based on the converted image data; and performing predictive coding on the image data subjected to the gradation change.

According to the coding apparatus of the present invention, it is possible to code input image data, while suppressing image quality deterioration.

The present invention may be embodied in other specific forms without departing from its spirit or characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

The entire disclosure of Japanese Patent Aplication No. 2005-083506 filed on Mar. 23, 2005 including specification, claims, drawings and abstract is incorporated herein by reference in its entirety.

What is claimed is:

1. A coding apparatus comprising:
    a memory; and
    a controller including:
        a color space conversion unit that converts input image data into image data which is represented in another color space, the input image data including a gradation value, the converted input image data being composed of a luminance or lightness component and other color components;
        a gradation changing unit that changes the gradation value of the input image data, based on the converted image data; and
        a predictive coding unit that performs predictive coding on the image data subjected to the gradation value change, wherein
    the gradation changing unit determines whether to change the gradation value of the input image data, based on the image data converted by the color space conversion unit, and
    the gradation changing unit calculates a difference between a pixel value of a pixel of the converted image data and a predicted pixel value of the pixel of the converted image data for each color component, and compares the difference with a tolerance set for each color component to determine whether to change the gradation value of the input image data.

2. The coding apparatus according to claim 1, wherein the gradation changing unit changes the gradation value of the image data converted by the color space conversion unit.

3. The coding apparatus according to claim 2, further comprising:
    a color space reconversion unit that converts the image data subjected to the gradation value change into image data represented in the same color space as for the input image data.

4. The coding apparatus according to claim 3,
    wherein the input image data is represented in an RGB color space,
    the color space conversion unit converts the input image data into the image data represented in another color space, and
    the color space reconversion unit converts the image data subjected to the gradation value change by the gradation changing unit into image data represented in the RGB color space.

5. The coding apparatus according to claim 1, wherein the gradation changing unit changes a gradation range of at least one of color components of the another color space.

6. The coding apparatus according to claim 1, wherein the other color components include chrominance components.

7. A coding method comprising:
    converting, by a controller, input image data to image data which is represented in another color space, the input image data including a gradation value, the converted input image data being composed of a luminance or lightness component and other color components;
    determining, by the controller, if changing the gradation value of the input image data is permitted based on comparing a calculated a difference between a pixel value of a pixel of the converted image data and a predicted pixel value of the pixel of the converted image data for each color component with a tolerance set for each color component;
    changing, by the controller, the gradation value of the input image data when changing the gradation value is permitted, based on the converted image data; and
    performing, by the controller, predictive coding on the image data subjected to the gradation value change.

8. The coding method according to claim 7, wherein the other color components include chrominance components.

9. A non-transitory storage medium readable by a computer, the storage medium storing a program comprising instructions causing a computer to execute a function comprising:
    converting input image data to image data which is represented in another color space, the input image data including a gradation value, the converted input image data being composed of a luminance or lightness component and other color components;
    determining if changing the gradation value of the input image data is permitted based on comparing a calculated a difference between a pixel value of a pixel of the converted image data and a predicted pixel value of the pixel of the converted image data for each color component with a tolerance set for each color component;
    changing the gradation value of the input image data when changing the gradation value is permitted, based on the converted image data; and
    performing predictive coding on the image data subjected to the gradation value change.

10. The storage medium according to claim 9, wherein the other color components include chrominance components.

* * * * *